United States Patent
Huang et al.

(10) Patent No.: US 8,920,018 B2
(45) Date of Patent: Dec. 30, 2014

(54) FRONT LIGHT MODULE

(75) Inventors: Hsin-Tao Huang, Hsinchu (TW);
Chuang-Chuang Tsai, Hsinchu (TW)

(73) Assignee: E Ink Holdings Inc., Hsinchu (TW)

(*) Notice: Subject to any disclaimer, the term of this patent is extended or adjusted under 35 U.S.C. 154(b) by 426 days.

(21) Appl. No.: 13/414,040

(22) Filed: Mar. 7, 2012

(65) Prior Publication Data
US 2012/0281430 A1 Nov. 8, 2012

(30) Foreign Application Priority Data

May 3, 2011 (TW) .............................. 100115517 A

(51) Int. Cl.
*F21V 7/04* (2006.01)
*F21V 8/00* (2006.01)
*G02F 1/1335* (2006.01)

(52) U.S. Cl.
CPC ............ *G02B 6/0061* (2013.01); *G02B 6/0016* (2013.01); *G02B 6/0053* (2013.01); *G02B 6/0055* (2013.01); *G02F 2001/133616* (2013.01)
USPC ............ 362/615; 362/617; 362/618; 362/602

(58) Field of Classification Search
USPC .................... 362/97.1, 97.2, 97.3, 97.4, 602, 362/606–608, 615, 617, 618; 349/56, 58, 349/61–65
See application file for complete search history.

(56) References Cited

U.S. PATENT DOCUMENTS

| | | | | |
|---|---|---|---|---|
| 2008/0232135 A1* | 9/2008 | Kinder et al. | ................. | 362/615 |
| 2009/0257108 A1* | 10/2009 | Gruhlke et al. | ................. | 359/290 |
| 2011/0286222 A1* | 11/2011 | Coleman | ................. | 362/326 |
| 2012/0069031 A1* | 3/2012 | Bita et al. | ................. | 345/520 |
| 2012/0140434 A1* | 6/2012 | Huang et al. | ................. | 362/19 |

* cited by examiner

*Primary Examiner* — Anh Mai
*Assistant Examiner* — Kevin Quarterman
(74) *Attorney, Agent, or Firm* — Guice Patents PLLC

(57) ABSTRACT

A front light module, including: a light source; a light guide plate, having a first refractive index and having a side face neighboring the light source; a medium layer, placed over the light guide plate and having a second refractive index, wherein the second refractive index is smaller than the first refractive index; a transparent material layer, placed over the medium layer; and a transparent glue layer, placed under the light guide plate and having a third refractive index, wherein the third refractive index is larger than the refractive index of air and smaller than or equal to the first refractive index.

25 Claims, 8 Drawing Sheets

FRONT LIGHT MODULE

BACKGROUND OF THE INVENTION

1. Field of the Invention

The present invention relates to a front light module, especially to a front light module capable of improving display quality.

2. Description of the Related Art

Front light modules for transflective or reflective displays are commonly of edge-lighting type or direct-lighting type, wherein the front light modules of edge-lighting type are becoming dominant due to the market's growing demand of small form factor on displays.

Prior art front light modules of edge-lighting type generally install a downward-light-guiding means on the top face of a light guide plate, to transform an edge light to a uniform plane light, which emits light beams downward to provide illumination for a display. Please refer to FIG. 1, which illustrates a sectional view of a prior art front light module for providing a plane light to illuminate a reflective type LCD 140. As illustrated in FIG. 1, the prior art front light module includes a light source 100, a reflective cover 110, a diffusion plate 120, and a light guide plate 130.

In the module, the light source 100, reflective cover 110, and diffusion plate 120 are used for providing diffused incident light.

The light guide plate 130, of which the left side face is a light entrance surface neighboring the diffusion plate 120, and the bottom face is a light exit surface, has a plurality of diffusion points 131 on the top face, wherein, the diffused incident light hitting the diffusion points 131 indirectly (after going through a total reflection at the bottom face of the light guide plate 130) or directly will be scattered off, and some of the scattered light—of which the traveling direction forms with the normal of the light exit surface an angle smaller than a total reflection angle—will pass through the light exit surface to illuminate the reflective type LCD 140.

There is another prior art design using microstructures as a means for guiding light downward. Please refer to FIG. 2, which illustrates a sectional view of another prior art front light module for providing a plane light to illuminate a reflective type LCD 240. As illustrated in FIG. 2, the prior art front light module includes a light source 200, a reflective cover 210, a diffusion plate 220, and a light guide plate 230.

In the module, the light source 200, reflective cover 210, and diffusion plate 220 are used for providing diffused incident light.

The light guide plate 230, of which the left side face is a light entrance surface neighboring the diffusion plate 220, and the bottom face is a light exit surface, has a plurality of V type microstructures 231 on the top face, wherein, the diffused incident light hitting the V type microstructures 231 indirectly (after going through a total reflection at the bottom face of the light guide plate 230) or directly will be reflected to travel down along the normal of the light exit surface to pass through the light exit surface to illuminate the reflective type LCD 240.

However, as the diffusion points 131 of the prior art front light module of FIG. 1 and the V type microstructures 231 of the prior art front light module of FIG. 2 are located at the top face of the light guide plate, therefore they both have the problem of being subject to getting scratched, which will degrade display quality, and even make the front light modules disqualified.

In view of the foregoing problem, the present invention proposes a front light module having a novel structure for guiding light downward.

SUMMARY OF THE INVENTION

One objective of the present invention is to disclose a front light module having a novel structure for guiding light downward, which can avoid getting scratched.

Another objective of the present invention is to disclose a front light module having a novel structure for guiding light downward, which is easy to implement.

Still another objective of the present invention is to disclose a front light module, which has a novel structure for guiding light downward with high efficiency.

To attain the foregoing objectives, a front light module is proposed, the module including a light source, a light guide plate, a medium layer, a transparent material layer, and a transparent glue layer.

In the module, the light source is used for providing incident light.

The light guide plate, of a first refractive index, has a side face neighboring the light source.

The medium layer is placed over the light guide plate and has a second refractive index, wherein the second refractive index is smaller than the first refractive index.

The transparent material layer is placed over the medium layer to form a protection layer.

The transparent glue layer is placed under the light guide plate and has a third refractive index, wherein the third refractive index is larger than the refractive index of air and smaller than or equal to the first refractive index.

Preferably, the light source includes a fluorescent lamp or a LED.

Preferably, the light guide plate has a first pattern on the top face.

Preferably, the first pattern includes a plurality of V type microstructures or a plurality of diffusion points.

Preferably, the transparent material layer is made of glass.

Preferably, the transparent glue layer has a second pattern formed by a plurality of pillar structures.

Preferably, the area of top face of the pillar structure varies with the distance between the pillar structure and the light source in a way that the area becomes larger as the distance increases.

Preferably, the gap between two neighboring pillar structures varies with the distance between the gap and the light source in a way that the gap becomes smaller as the distance increases.

Still preferably, the light guide plate can further include a third pattern on the bottom face, wherein the third pattern engages with the second pattern in a complementary manner.

Still preferably, the area of bottom face of the extruding structure varies with the distance between the extruding structure and the light source in a way that the area becomes smaller as the distance increases To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
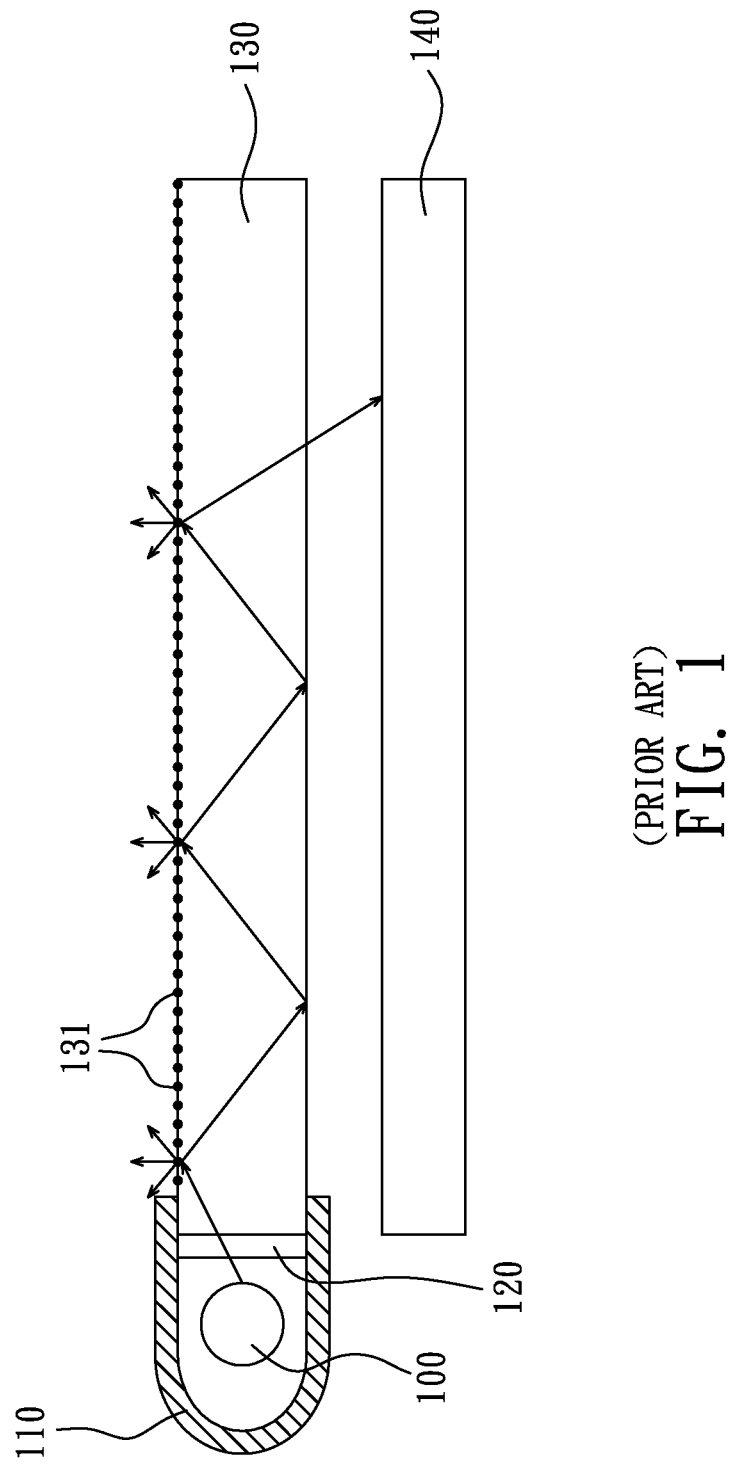
FIG. 1 illustrates a sectional view of a prior art front light module for providing a plane light to illuminate a reflective type LCD.
Figure 2:
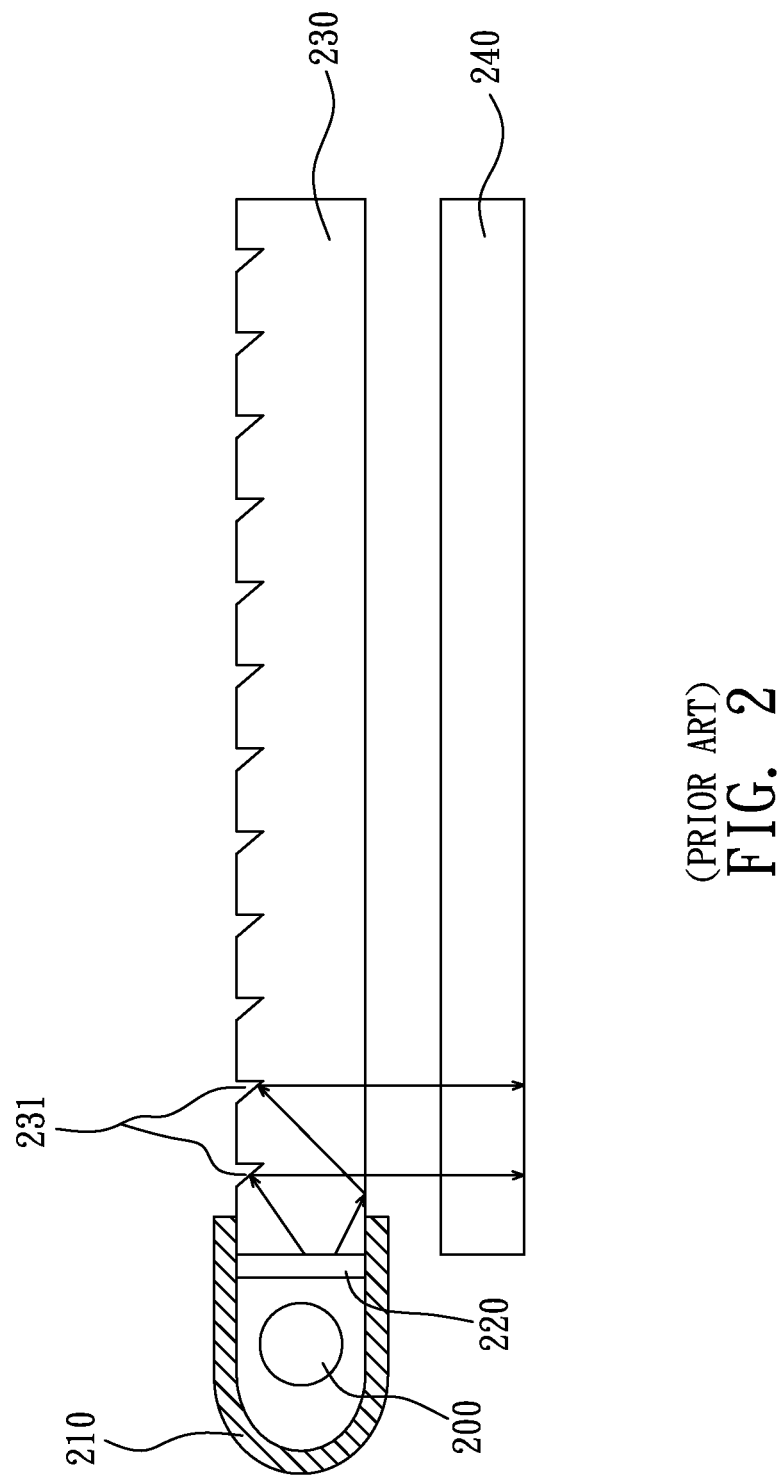
FIG. 2 illustrates a sectional view of another prior art front light module for providing a plane light to illuminate a reflective type LCD.
Figure 3A:
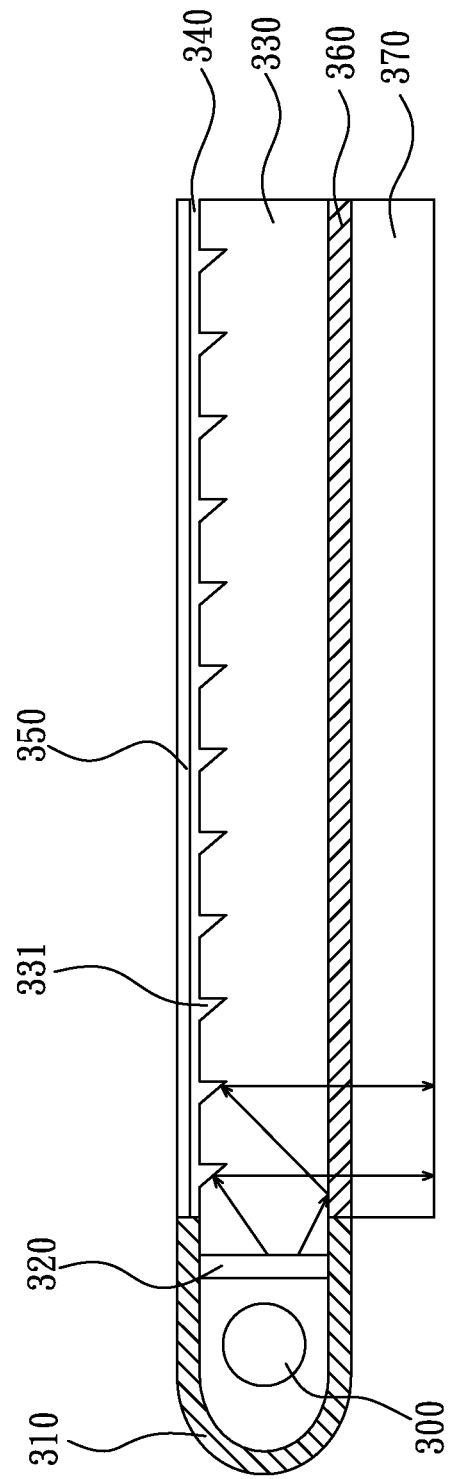
FIG. 3a illustrates a sectional view of a front light module according to a preferred embodiment of the present invention, wherein the front light module provides a plane light for an electronic paper device.

Please refer to FIG. 3a, which illustrates a sectional view of a front light module according to a preferred embodiment of the present invention, wherein the front light module provides a plane light for an electronic paper device 370. As illustrated in FIG. 3a, the front light module includes a light source 300, a reflective cover 310, a diffusion plate 320, a light guide plate 330, a medium layer 340, a transparent material layer 350, and a transparent glue layer 360.

In the module, the light source 300, the reflective cover 310, and the diffusion plate 320 are used to provide diffused incident light.

The light guide plate 330, of which the left side face is a light entrance surface neighboring the diffusion plate 320 and the light source 300, and of which the bottom face is a light exit surface, has a first refractive index and has a first pattern formed by a plurality of V type microstructures 331 on the top face, wherein, the diffused incident light hitting the V type microstructures 331 indirectly (after going through a total reflection at the bottom face of the light guide plate 330) or directly will be reflected to travel down along the normal of the light exit surface to pass through the light exit surface to illuminate the electronic paper device 370.

The medium layer 340, for example but not limited to a glue layer or a layer of air gap, has a second refractive index and is placed over the light guide plate 330. The second refractive index is set to be smaller than the first refractive index so that the incident light beams of large angles of incidence can be kept from passing through the top face of the light guide plate 330, and thereby improve the efficiency in guiding light downward.

The transparent material layer 350, placed over the medium layer 340, is used for preventing the V type microstructures 331 from getting scratched. Preferably, the transparent material layer 350 is made of glass.

The transparent glue layer 360 has a third refractive index and is placed under the light guide plate 330, wherein the third refractive index is larger than the refractive index of air and smaller than or equal to the first refractive index, so as to set a proper total reflection angle on the bottom face of the light guide plate 330, causing a proper ratio of the incident light transmitted to the right side of the light guide plate 330, and thereby improving the uniformity of the light guided downward by the light guide plate 330.

The electronic paper device 370, placed under the transparent glue layer 360, can be a reflective type or transflective type display device, for example but not limited to electrophoresis display, MEMS (Micro Electro Mechanical System) display, cholesteric liquid crystal display, electrowetting display, liquid crystal display, organic/inorganic Electroluminescence display, or electrochromic display.

Figure 3B:
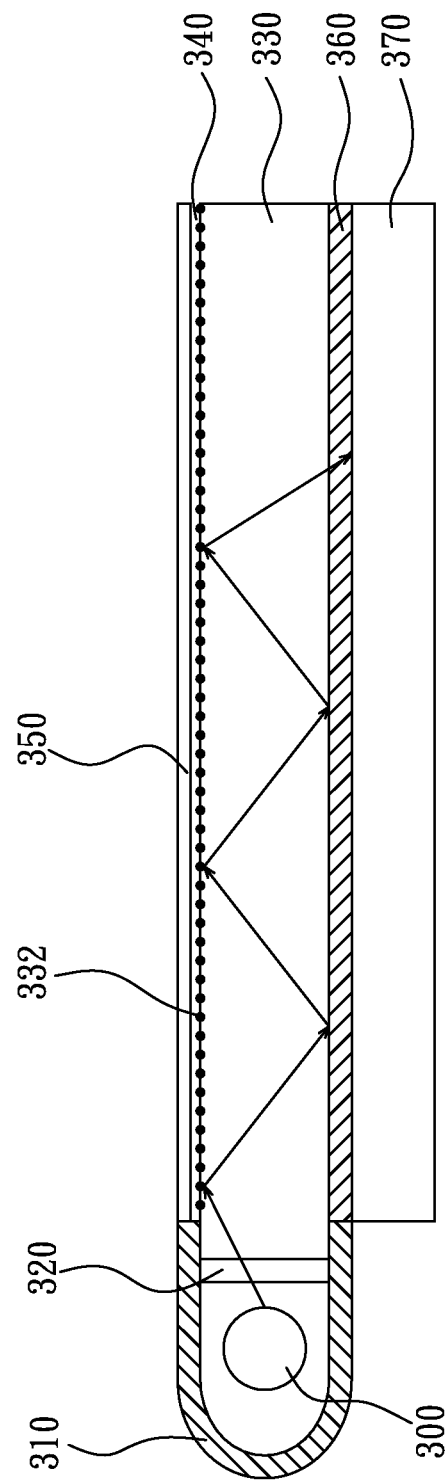
FIG. 3b illustrates a sectional view of a front light module according to another preferred embodiment of the present invention, wherein the front light module provides a plane light for an electronic paper device.

Please refer to FIG. 3b, which illustrates a sectional view of a front light module according to another preferred embodiment of the present invention, wherein the front light module provides a plane light for an electronic paper device 370. As illustrated in FIG. 3b, the front light module includes a light source 300, a reflective cover 310, a diffusion plate 320, a light guide plate 330, a medium layer 340, a transparent material layer 350, and a transparent glue layer 360.

The difference between FIG. 3b and FIG. 3a is that the pattern on the top face of the light guide plate 330 includes a plurality of diffusion points 332 in FIG. 3b, while the pattern on the top face of the light guide plate 330 includes a plurality of V type microstructures 331 in FIG. 3a. In the module of FIG. 3b, the diffused incident light hitting the diffusion points 332 indirectly (after going through a total reflection at the bottom face of the light guide plate 330) or directly will be scattered off, and some of the scattered light—of which the traveling direction forms with the normal of the light exit surface an angle smaller than a total reflection angle—will pass through the light exit surface to illuminate the electronic paper device 370.

As the operation principles of other components in FIG. 3b have been elaborated in the specification of FIG. 3a, they will not be readdressed here.

Figure 4A:
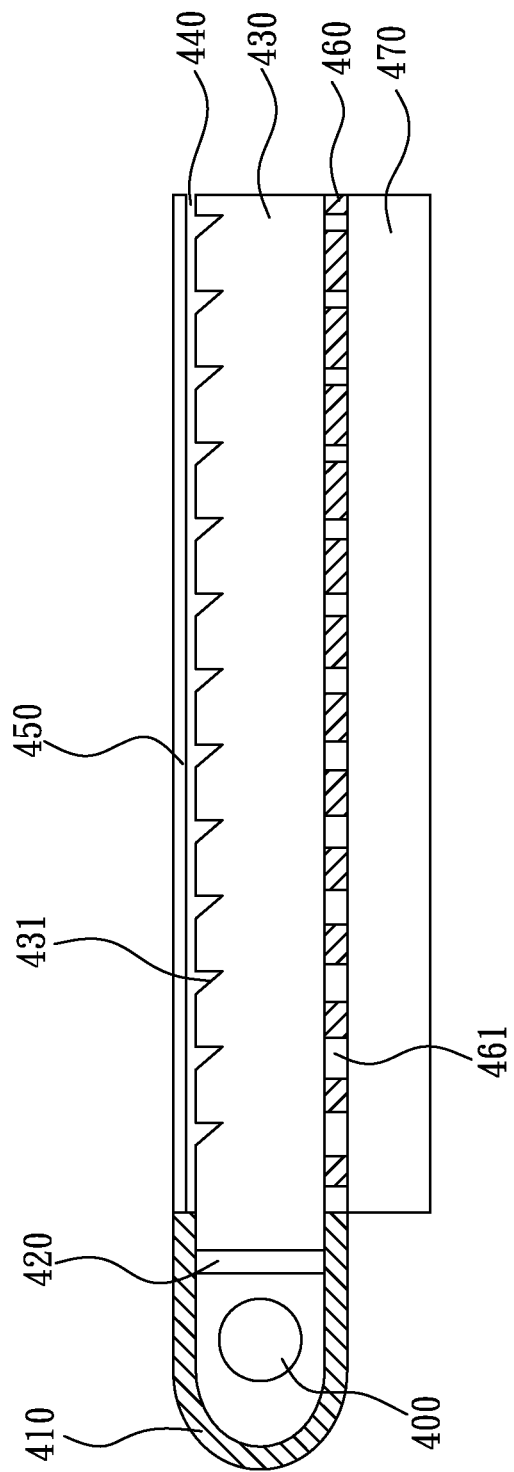
FIG. 4a illustrates a sectional view of a front light module according to still another preferred embodiment of the present invention, wherein the front light module provides a plane light for an electronic paper device.

Please refer to FIG. 4a, which illustrates a sectional view of a front light module according to still another preferred embodiment of the present invention, wherein the front light module provides a plane light for an electronic paper device 470. As illustrated in FIG. 4a, the front light module includes a light source 400, a reflective cover 410, a diffusion plate 420, a light guide plate 430, a medium layer 440, a transparent material layer 450, and a transparent glue layer of a pattern including a plurality of pillar structures 460.

The difference between FIG. 4a and FIG. 3a is that the transparent glue layer in FIG. 4a is further processed to have a pattern including a plurality of pillar structures 460. The pillar structures 460 are placed under the bottom face of the light guide plate 430, and there is a gap 461—of which the refractive index is equal to 1—between any two neighboring pillar structures 460, wherein, the area of top face of the pillar structure 460 is dependent on the distance between the pillar structure 460 and the light source 400—the farer the distance, the larger the area of top face, and when the area of top face of the pillar structure 460 gets larger, the gap 461 will become smaller. With this arrangement, the ratio of the downward guided light to the totally reflected light at the bottom face of the light guide plate 430 will vary with the distance between the pillar structure 460 and the light source 400—the farer the distance, the larger the ratio, so as to adjust the intensity distribution of the downward guided light over the bottom face of the light guide plate 430 to provide a uniform plane light.

As the operation principles of other components in FIG. 4a have been elaborated in the specification of FIG. 3a, they will not be readdressed here.

Figure 4B:
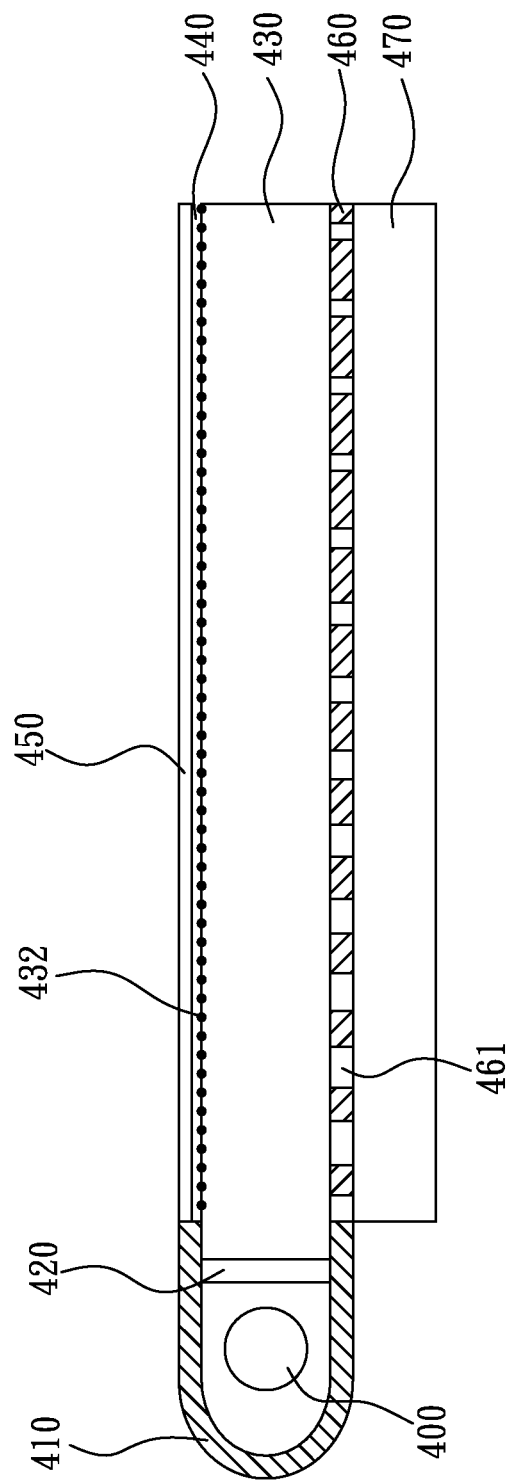
FIG. 4b illustrates a sectional view of a front light module according to still another preferred embodiment of the present invention, wherein the front light module provides a plane light for an electronic paper device.

Please refer to FIG. 4b, which illustrates a sectional view of a front light module according to still another preferred embodiment of the present invention, wherein the front light module provides a plane light for an electronic paper device 470. As illustrated in FIG. 4b, the front light module includes a light source 400, a reflective cover 410, a diffusion plate 420, a light guide plate 430, a medium layer 440, a transparent material layer 450, and a transparent glue layer of a pattern including a plurality of pillar structures 460.

The difference between FIG. 4b and FIG. 4a is that the pattern on the top face of the light guide plate 430 includes a plurality of diffusion points 432 in FIG. 4b, while the pattern on the top face of the light guide plate 430 includes a plurality of V type microstructures 431 in FIG. 4a. In the module of FIG. 4b, the diffused incident light hitting the diffusion points 432 indirectly (after going through a total reflection at the bottom face of the light guide plate 430) or directly will be scattered off, and some of the scattered light—of which the traveling direction forms with the normal of the light exit surface an angle smaller than a total reflection angle—will pass through the light exit surface to illuminate the electronic paper device 470.

As the operation principles of other components in FIG. 4b have been elaborated in the specification of FIG. 4a, they will not be readdressed here.

Figure 5A:
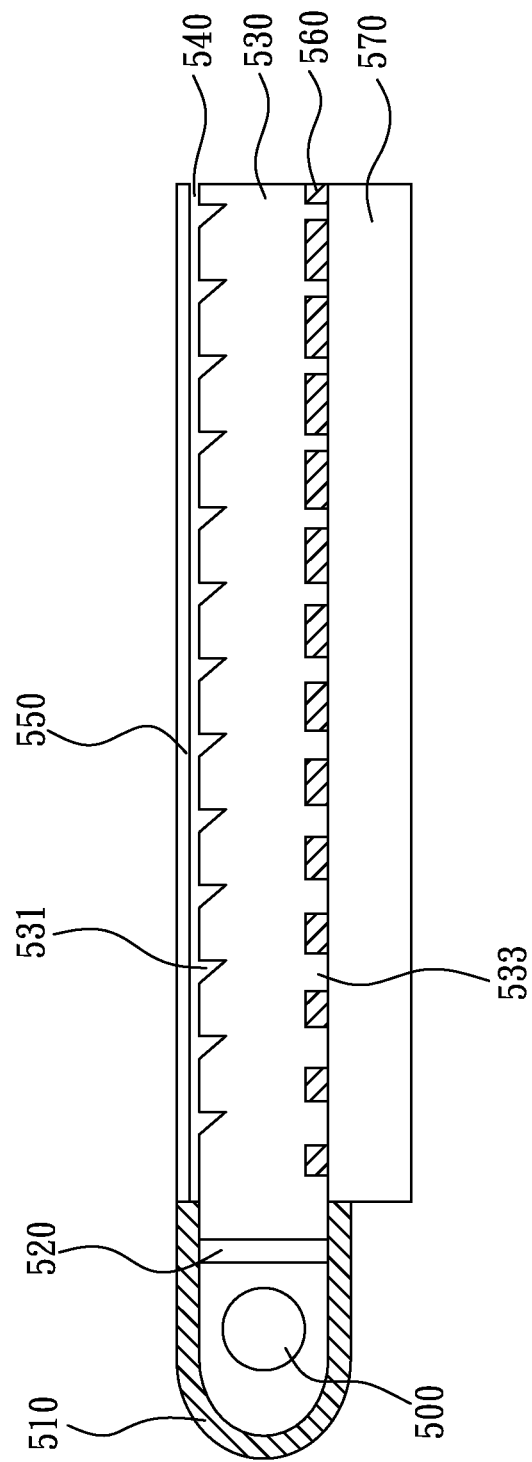
FIG. 5a illustrates a sectional view of a front light module according to still another preferred embodiment of the present invention, wherein the front light module provides a plane light for an electronic paper device.

Please refer to FIG. 5a, which illustrates a sectional view of a front light module according to still another preferred embodiment of the present invention, wherein the front light module provides a plane light for an electronic paper device 570. As illustrated in FIG. 5a, the front light module includes a light source 500, a reflective cover 510, a diffusion plate 520, a light guide plate 530, a medium layer 540, a transparent material layer 550, and a transparent glue layer of a second pattern including a plurality of pillar structures 560.

The difference between FIG. 5a and FIG. 4a is that the bottom face of the light guide plate 530 in FIG. 5a is further processed to have a third pattern including a plurality of extruding structures 533, so as to engage with the pattern of the transparent glue layer in a complementary manner, wherein, the area of bottom face of the extruding structure 533 is dependent on the distance between the extruding structure 533 and the light source 500—the farer the distance, the smaller the area of bottom face. With this arrangement, the ratio of the downward guided light to the totally reflected light at the bottom face of the light guide plate 530 will vary with the distance between the pillar structure 560 and the light source 500—the farer the distance, the larger the ratio, so as to adjust the intensity distribution of the downward guided light over the bottom face of the light guide plate 530 to provide a uniform plane light.

As the operation principles of other components in FIG. 5a have been elaborated in the specification of FIG. 4a, they will not be readdressed here.

Figure 5B:
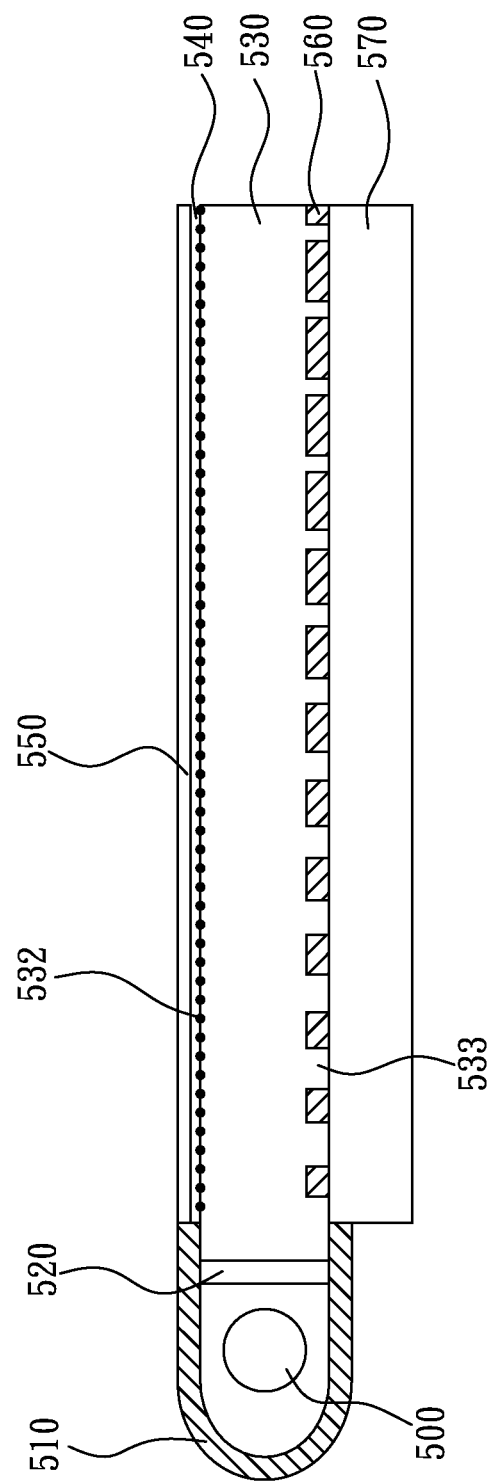
FIG. 5b illustrates a sectional view of a front light module according to still another preferred embodiment of the present invention, wherein the front light module provides a plane light for an electronic paper device.

Please refer to FIG. 5b, which illustrates a sectional view of a front light module according to still another preferred embodiment of the present invention, wherein the front light module provides a plane light for an electronic paper device 570. As illustrated in FIG. 5b, the front light module includes a light source 500, a reflective cover 510, a diffusion plate 520, a light guide plate 530, a medium layer 540, a transparent material layer 550, and a transparent glue layer of a pattern including a plurality of pillar structures 560.

The difference between FIG. 5b and FIG. 5a is that the pattern on the top face of the light guide plate 530 includes a plurality of diffusion points 532 in FIG. 5b, while the pattern on the top face of the light guide plate 530 includes a plurality of V type microstructures 531 in FIG. 5a. In the module of FIG. 5b, the diffused incident light hitting the diffusion points 532 indirectly (after going through a total reflection at the bottom face of the light guide plate 530) or directly will be scattered off, and some of the scattered light—of which the traveling direction forms with the normal of the light exit surface an angle smaller than a total reflection angle—will pass through the light exit surface to illuminate the electronic paper device 570.

As the operation principles of other components in FIG. 5b have been elaborated in the specification of FIG. 5a, they will not be readdressed here.

In conclusion, through the novel design of the medium layer and the transparent material layer of the present invention, the top surface of the light guide plate can be protected and the efficiency in guiding light downward can be improved. Besides, the pillar structures under the light guide plate of the present invention can make the light guide plate provide a more uniform plane light to improve display quality. The present invention therefore possesses superior advantages.

While the invention has been described by way of example and in terms of a preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A front light module, comprising:
   a light source;
   a light guide plate, having a first refractive index and having a side face neighboring said light source;
   a medium layer, placed over said light guide plate and having a second refractive index, said medium layer prevents incident light beams of large angles of incidence from passing through a top face of said light guide plate, wherein said second refractive index is smaller than said first refractive index;
   a transparent material layer, placed over said medium layer; and
   a transparent glue layer, placed under said light guide plate and having a third refractive index, said transparent glue layer has a plurality of pillar structures, wherein said third refractive index is larger than the refractive index of air and smaller than or equal to said first refractive index;
   wherein said medium layer is located above said light guide plate and said transparent glue is located below said light guide plate.

2. The front light module as claim 1, wherein said light source comprises lighting device selected from a group consisting of a fluorescent lamp and a LED.

3. The front light module as claim 1, wherein said light guide plate has a first pattern located on the top face.

4. The front light module as claim 3, wherein said first pattern includes a pattern selected from a group consisting of a plurality of V type microstructures and a plurality of diffusion points.

5. The front light module as claim 3, wherein said transparent glue layer has a second pattern including said plurality of pillar structures.

6. The front light module as claim 5, wherein an area of a top face of each pillar structure of said plurality of pillar structures varies with a distance between said pillar structure and said light source in a way that said area of each said pillar structure of said plurality of pillar structures becomes larger as said distance increases.

7. The front light module as claim 5, wherein a gap located between two neighboring pillar structures of said plurality of pillar structures varies with a distance between said gap and said light source in a way that said gap becomes smaller as said distance increases.

8. The front light module as claim 5, wherein said light guide plate has a third pattern including a plurality of extruding structures on the bottom face of said light guide plate, wherein said third pattern engages with said second pattern in a complementary manner.

9. The front light module as claim 8, wherein an area of a bottom face of each extruding structure of said plurality of extruding structures varies with a distance between said extruding structure and said light source in a way that said area of the bottom face of each said extruding structure of said plurality of extruding structures becomes smaller as said distance increases.

10. The front light module as claim 8, wherein an area of a top face of each pillar structure of said plurality of pillar structures varies with a distance between said pillar structure and said light source in a way that said area of each said pillar structure of said plurality of pillar structures becomes larger as said distance increases.

11. The front light module as claim 8, wherein a gap located between two neighboring pillar structures of said plurality of pillar structures varies with a distance between said gap and said light source in a way that said gap becomes smaller as said distance increases.

12. The front light module as claim 1, wherein said transparent material layer comprises glass.

13. The front light module as claim 1, wherein bottom faces of said plurality of pillar structures of said transparent glue layer are attached to an electronic paper device.

14. The front light module as claim 13, wherein said electronic paper device is a device selected from a group consisting of a reflective type display device and a transflective type display device.

15. The front light module as claim 13, wherein said electronic paper device is a device selected from the group consisting of electrophoresis display, MEMS (Micro Electro Mechanical System) display, cholesteric liquid crystal display, electrowetting display, liquid crystal display, organic/inorganic Electroluminescence display, and electrochromic display.

16. A front light module, comprising:
a light source;
a light guide plate, having a first refractive index and having a side face neighboring said light source;
a medium layer, placed over said light guide plate and having a second refractive index, said medium layer prevents incident light beams of large angles of incidence from passing through a top face of said light guide plate, wherein said second refractive index is smaller than said first refractive index;
a transparent material layer, placed over said medium layer; and
a transparent glue layer, placed under said light guide plate and having a third refractive index, said transparent glue layer has a plurality of pillar structures, wherein said third refractive index is larger than the refractive index of air and smaller than or equal to said first refractive index, and bottom faces of said plurality of pillar structures of said transparent glue layer are attached to an electronic paper device;
wherein said medium layer is located above said light guide plate and said transparent glue is located below said light guide plate.

17. The front light module as claim 16, wherein said light guide plate has a first pattern located on the top face.

18. The front light module as claim 17, wherein said first pattern includes a pattern selected from a group consisting of a plurality of V type microstructures and a plurality of diffusion points.

19. The front light module as claim 18, wherein said transparent glue layer has a second pattern including said plurality of pillar structures.

20. The front light module as claim 19, wherein an area of a top face of each pillar structure of said plurality of pillar structures varies with a distance between said pillar structure and said light source in a way that said area of each said pillar structure of said plurality of pillar structures becomes larger as said distance increases.

21. The front light module as claim 19, wherein a gap located between two neighboring pillar structures of said plurality of pillar structures varies with a distance between said gap and said light source in a way that said gap becomes smaller as said distance increases.

22. The front light module as claim 19, wherein said light guide plate has a third pattern including a plurality of extruding structures on the bottom face, wherein said third pattern engages with said second pattern in a complementary manner.

23. The front light module as claim 22, wherein an area of a bottom face of each extruding structure of said plurality of extruding structures varies with a distance between said extruding structure and said light source in a way that said area of the bottom face of each said extruding structure of said plurality of extruding structures becomes smaller as said distance increases.

24. The front light module as claim 22, wherein an area of a top face of each pillar structure of said plurality of pillar structures varies with a distance between said pillar structure and said light source in a way that said area of each said pillar structure of said plurality of pillar structures becomes larger as said distance increases.

25. The front light module as claim 22, wherein a gap located between two neighboring pillar structures of said plurality of pillar structures varies with a distance between said gap and said light source in a way that said gap becomes smaller as said distance increases.

* * * * *